Jan. 25, 1927.

R. T. PIERCE

MEASURING INSTRUMENT

Filed April 29, 1924

1,615,648

WITNESSES:

INVENTOR
Raymond T. Pierce.
BY
ATTORNEY

Patented Jan. 25, 1927.

1,615,648

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

Application filed April 29, 1924. Serial No. 709,734.

My invention relates to electrical measuring devices and particularly to instruments for measuring the resistance of electrical circuits.

One object of my invention is to provide an electrical measuring instrument that shall determine the resistance of an electrical circuit by comparing different quantities of the electrical circuit.

Another object of my invention is to provide an electrical measuring instrument that shall indicate a ratio between the current traversing an electric circuit and the voltage impressed upon the circuit.

A further object of my invention is to provide an electrical measuring instrument that shall indicate the resistance of an electrical circuit by indicating a ratio between the amount of current traversing the circuit and the voltage impressed thereon.

In electrical systems, particularly such as are employed with turbo-generator units, it it sometimes necessary to determine the resistance of the winding under conditions where direct readings are very difficult to secure. My electrical measuring device is particularly adapted for such service for the reason that a ratio of the current traversing the circuit and the voltage impressed upon it, which ratio indicates the resistance of the circuit, is continuously given.

Figure 1:
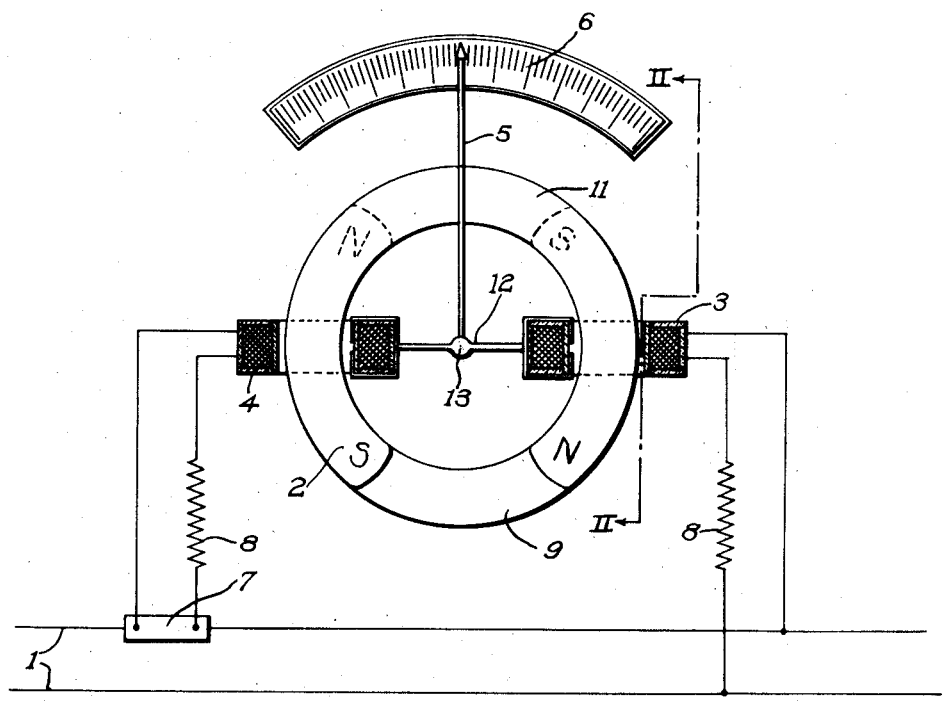
Figure 2:
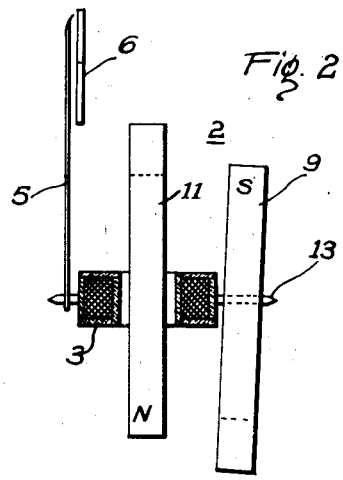

In the accompanying drawings,

Figure 1 is a diagrammatic view of circuits and apparatus embodying my invention, and Fig. 2 is a view, partially in elevation and partially in section, taken along the section line II—II in Fig. 1.

My invention comprises, in general, an electric circuit 1 for supplying energy to any electrical translating device (not shown), and a magnet structure 2 on which a pair of mechanically connected coils 3 and 4, controlling a pointer 5, are mounted for co-operation with a scale 6.

The circuit 1 may supply energy to any desired translating device (not shown) although my measuring instrment is particularly adapted for use in connection with turbo-generator units. The coil 3 is connected across the circuit 1 in such manner that it is energized in accordance with the voltage impressed upon the circuit, the resistance of which is to be measured. The coil 4 is connected, as at 7, to the circuit 1 in such manner that the current traversing the same is a direct measure of the current traversing the circuit 1, the resistance of which is to be measured.

In Fig. 1, the coil 4 is shown as directly connected in series with the circuit 1, although it is to be understood that a suitable shunt may be inserted at 7, whereby the coil 4 is connected in parallel relation thereto. Under the latter conditions, the coil 4 would still be energized directly in proportion to the current traversing the circuit 1. Suitable resistors 8 are inserted in series with the coils 3 and 4 for calibrating purposes and in order to limit the current supplied thereto.

Referring to Fig. 2, the magnet structure 2 comprises a pair of permanent magnets 9 and 11 each of which subtends substantially 270° of a circle. The open portions of the magnets 9 and 11 are positioned at diametrically opposed points in the magnet structure 2. The segments 9 and 11 are held at a slight angular position with relation to each other so that the upper portions thereof are at a greater distance apart than are the lower portions.

The coils 3 and 4 are connected by a lever 12 pivotally mounted, as at 13, and which carries the pointer 5. The coils 3 and 4 are placed about the segment 11 of the magnet structure 2 in such manner that they extend into the space between the segments 9 and 11 and are free to move therein. The polarity of the segments 9 and 11 is opposite with the result that lines of magnetic flux traverse the space therebetween. By reason of the fact that the segments 9 and 11 are positioned at an angle to each other, the density of the lines of flux traversing the lower portion of the magnet structure 2 is greater than in the upper portion thereof.

In the operation of my measuring device, the coils 3 and 4 are energized respectively in accordance with the voltage and the current traversing the circuit 1. The currents in the coils react with the magnetic flux between the segments 9 and 11 to produce motion. Both coils act in the same direction so that the moving system tends to assume a position where these forces are equal and opposite. By reason of the fact that the coils 3 and 4 are mechanically connected by the lever 12, the position of the pointer 5 indicates the resultant of the forces reacting between the coils 3, 4 and the magnet structure 2.

In the event that a state of equilibrium is obtained between the magnetic forces set up by the coils 3 and 4 and the magnet structure 2, any increase in the energization of either of the coils 3 or 4 causes an increased inductive reaction between it and the lines of magnetic flux traversing the space between the magnets 9 and 11 of the magnet structure 2, whereupon the affected coil tends to move toward the upper portion of the magnet structure 2. Such movement tends to depress the other coil downwardly with relation to the magnet structure 2.

Referring to Fig. 2, upward movement of either coil brings it into a less dense field of magnetic flux, while downward movement of the other coil brings it into a flux field of greater density, whereby the increase in excitation of the particular coil is counterbalanced by moving it into a field of lesser magnetic density and by moving the opposing coil into a field of greater magnetic density. At all times the pointer 5 and the scale 6 represent the ratio between the excitation of the coil 3 and the coil 4, which ratio represents the resistance of the translating device connected to the circuit 1.

In the event that either of the coils 3 and 4 becomes weaker by reason of a reduction in the amount of current traversing the circuit or by reason of a drop of potential applied thereto, the affected coil immediately moves downwardly into a stronger magnetic field and the opposing coil moves upwardly into a less dense magnetic field until a state of equilibrium again obtains. By reason of the fact that the coils 3 and 4 always remain in equilibrium with respect to the magnetic fields of the magnet structure 2, the pointer 5 in conjunction with the scale 6 always indicates the value of the resistance of the circuit 1.

It will thus be seen that I have provided an electrical measuring instrument that measures the ratio between two quantities of an electric circuit at all times. My electrical measuring device is particularly adapted for use in measuring the temperature of electric furnaces, or the like, wherein temperature conditions correspond to a function of the resistance offered to current flow by the electrical circuit supplying energy thereto.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. An electrical measuring instrument comprising a permanent-magnet structure embodying co-operating portions having diverging surfaces disposed in surface-to-surface relation and remotely related pole ends providing a varying space gap therebetween, and a relatively movable element carrying a pair of coils adapted to be energized and thereby moved into flux-field portions of equal magnetic force between said surfaces.

2. An electrical measuring insrument comprising a permanent-magnet structure embodying co-operating portions having diverging surfaces disposed in surface-to-surface relation and remotely related pole ends providing a varying space gap therebetween, and a relatively movable element carrying a pair of coils adapted to be energized in accordance with the volts and the amperes of a circuit, respectively, and thereby moved into flux-field portions of equal magnetic force between said surfaces to indicate the resistance of the circuit.

3. An electrical measuring instrument comprising a permanent-magnet structure embodying co-operating portions having plane surfaces disposed in angularly-related surface-to-surface relation and remotely related pole ends to provide a varying space gap therebetween, and a pivoted balance-arm structure carrying voltage and current coils at opposite sides of its pivot and having portions in said gap for movement into portions of the field in said gap of equal magnetic force in accordance with the resistance of a circuit.

4. An electrical measuring instrument comprising a pair of permanent magnets of substantially C-shape disposed in side-by-side relation and providing a varying space gap therebetween, and a pivoted balance-arm structure carrying voltage and current coils at opposite sides of its pivot and having portions in said gap for movement into portions of the field in said gap of equal magnetic force in accordance with the resistance of a circuit.

5. An electrical measuring instrument comprising a pair of permanent magnets of substantially C-shape disposed in side-by-side angular relation to provide a varying space gap therebetween, and a pivoted balance-arm structure carrying voltage and current coils at opposite sides of its pivot and having portions in said gap for movement into portions of the field in said gap of equal magnetic force in accordance with the resistance of a circuit.

6. An electrical measuring instrument comprising a magnet structure including a pair of magnet elements of substantially C-shape disposed in spaced side-by-side relation and having angularly displaced air gaps so that a solid portion of each is laterally opposite the air gap of the other, the adjacent surfaces of said elements being related to provide a varying space gap therebetween, and a relatively movable structure including an element disposed adjacent to said pair of elements and having flux cooperative therewith for movement about an axis therethrough upon the occurrence of a change of flux in one of the elements.

In testimony whereof, I have hereunto subscribed my name this 24th day of April, 1924.

RAYMOND T. PIERCE.